(12) United States Patent
Duym (10) Patent No.: US 8,458,589 B2
(45) Date of Patent: Jun. 4, 2013

(54) LOCALIZED LABEL USER INTERFACE CONTROL

(75) Inventor: Rudy G. Duym, Nice (FR)

(73) Assignee: Apple Inc., Cupertino, CA (US)

( * ) Notice: Subject to any disclaimer, the term of this patent is extended or adjusted under 35 U.S.C. 154(b) by 541 days.

(21) Appl. No.: 12/284,070

(22) Filed: Sep. 18, 2008

(65) Prior Publication Data

US 2010/0070843 A1 Mar. 18, 2010

(51) Int. Cl.
*G06F 17/24* (2006.01)

(52) U.S. Cl.
USPC .......................................................... 715/264

(58) Field of Classification Search
USPC .......................................................... 715/264
See application file for complete search history.

(56) References Cited

U.S. PATENT DOCUMENTS

| | | | |
|---|---|---|---|
| 5,664,206 A | 9/1997 | Murow et al. | |
| 6,138,086 A * | 10/2000 | Rose et al. | 704/8 |
| 6,311,151 B1 | 10/2001 | Yamamoto et al. | |
| 6,754,688 B2 * | 6/2004 | Pham et al. | 708/505 |
| 7,721,271 B2 * | 5/2010 | Pournasseh et al. | 717/137 |
| 2006/0004836 A1 * | 1/2006 | Dhingra | 707/102 |
| 2006/0080082 A1 * | 4/2006 | Ravindra et al. | 704/8 |
| 2008/0126958 A1 | 5/2008 | Louie | |
| 2009/0063499 A1 * | 3/2009 | Koinuma et al. | 707/10 |
| 2010/0057433 A1 * | 3/2010 | Jackson | 704/3 |

OTHER PUBLICATIONS

Popovic' et al.,"Augmenting a Small Parallel Text with Morpho-syntactic Language Resource for Serbian-English Stratistical Machine Translation", 2005, Association for Computational Linguistics, pp. 41-48.*

"Documentation for: ASP.NET Ajax Version 1.0"; Copyright 2005-2007; http://www.asp.net/ajax/documentation/live/overview/Localizing Resources.aspx, 11 pages.

"Documentation for ASP.NET Ajax Version 1.0"; 2005-2007; http://www.asp.net/ajax/documentation/live/overview/default.aspx, 5 pages.

"Developing a multi-locale site using WebSphere Portal V5.1.0.1"; Anil Ambati et al., http://www.ibm.com/developerworks/websphere/library/techarticles/0606_ambati/0606_ambat.html, Jun. 7, 2006; 6 pages.

"ADF Faces: Setting Locale through Application (rather than Browser language)"; Peter Ebell; Oct. 23, 2006; http://blogs.oracle.com/jheadstart/2006/10/adf_faces_setting_locale_throu.html; 4 pages.

(Continued)

*Primary Examiner* — Laurie Ries
*Assistant Examiner* — Tionna Smith
(74) *Attorney, Agent, or Firm* — Novak Druce Connolly Bove + Quigg LLP (57) ABSTRACT

A method for allowing a user-friendly localization of an entry form on an interactive web page includes providing an entry form having a plurality of editable input fields corresponding to a plurality of locale codes and providing at least one visible input field for display, wherein the remainder of the plurality of input fields are hidden until accessed. Data received are mapped to at least one input field selected from the plurality of input fields. As shown, data is transferred asynchronously to and from the plurality of editable input fields, without requiring updating any other information displayed on the web page. Computer systems, computer system environments, and computer programs available as a download or on a computer-readable medium for installation according to the invention are provided.

19 Claims, 5 Drawing Sheets

OTHER PUBLICATIONS

"Introducing XML Internationalization"; Herman Silberman; Jan. 3, 2007; http://www.ibm.com/developerworks/xml/library/x-il8n1.html, 6 pages.

"ASP.NET 2.0 to 3.5 Tricks and Tips"; Jul. 17, 2007; http://clinch-aspnet.blogspot.com/2007/07/aspnet-20-chat-that-uses-membership.html, 2 pages.

"Identity Manager Form Script API"; Rudy Duym; Jul. 19, 2007; http://www.novell.com/coolsolutions/appnote/19307.html, 14 pages.

"Adobe AIR Quick Start"; Printed Aug. 8, 2008; http://www.adobe.com/devnet/air/ajax/quickstart/multilingual_air_apps.html, 7 pages.

"Debian web site in different languages"; Printed Aug. 8, 2008; http://www.debian.org/intro/cn, 6 pages.

"Locale Hero: Enable Global Apps With Locale Builder and Windows Vista"; Kieran Snyder et al.; Printed Aug. 8, 2008. http://msdn.microsoft.com/en-us/magazine/cc163506(printer).aspx, . . .; 10 pages.

"Delta Air Lines- Tarifas y boletos de aerolineas para destinos internacionales##"; Printed Sep. 8, 2008; http://es.delta.com/delta/enes/?24;http://www.delta.com, 1 page.

"Delta Air Lines- Airline Tickets and Airfare to Worldwide Destinations##"; Printed Sep. 8, 2008; http://www.delta.com.

\* cited by examiner

| Role Name:* | [100, 102a, 104a] |
| Role Description:* | [102b, 104b] |
| Role Level | IT Role |
| Role Container | System |
| Role Owners | [102c] |
| Role Categories | bravo / charlie / Default / System Roles |

Approval Details

Approval Required  ○ Yes  ● No

[Save] [Remove] [Cancel]

LOCALIZED LABEL USER INTERFACE CONTROL

FIELD OF THE INVENTION

Generally, the present invention relates to computing methods and systems for providing interactive web pages. Particularly, it relates to computing methods and systems, and devices incorporating the methods and systems, for providing user-friendly localization of data displayed in an entry form in an interactive web page environment.

BACKGROUND OF THE INVENTION

Many software applications intended to be provided over the Internet include browser-based entry forms for the input of various data. In earlier days, computer users were often researchers and computer experts, who were often versed in foreign languages. Therefore, providing the data entered into the entry form in the desired language for viewing or use by a multinational audience was less problematic.

Currently, however, computer users come from all walks of life, may only be familiar with a few software applications for work or for home use, and are often familiar only with their native tongue. Still further, the current world-wide nature of computer infrastructure, i.e., the Internet, requires accessibility of particular computer programs, web pages, and the like in multiple languages according to the user's locale. While it is certainly possible to provide computer software in a multiplicity of languages in accordance with the locale in which it is intended be used, or to provide specific web-based applications in only the language of the locale in which it will be accessed, such a practice is logistically difficult and prohibitively costly. Still further, there is the issue of multiple users accessing the same information/entry forms over the Internet, and the need to provide that information in the user's language of choice. For example, a browser-based entry form may be desired for display and entry of data from multiple locales, i.e., different nations using different languages, and yet all to be transferred to one or more centrally-located servers which store the data in yet another language.

Because users of such applications may be located in several different locales, it is desirable to allow the localization of the browser based entry forms for different locales, that is, to allow multiple users in different locales to access the entry forms in their own language. Localization broadly refers to adaptation of user interfaces for software to a local user's culture. Typically, this means at least translation of the interface into the user's language, but also may include such diverse aspects as local time, date, and number formats.

Certainly, it is known to provide means for localization, such as language translation, by translating entire web browser pages into the desired language, time/date/number format, etc. However, allowing localization of a label in a browser based entry form can be unwieldy and unsightly because providing many locales, that is, allowing entry of data in many languages/formats, can take up a large amount of space on the entry form. This is particularly true if having a value for all locales is not required. For example, numerous input fields are necessary to allow localization of the labels. Further, translation of an entire browser page is cumbersome, requiring updating or refreshing the entirety of the information on the page, rather than perhaps only the information which the user desires to view. Even more, in some applications it may be necessary to access multiple menus or to visit multiple web pages to access the desired information in the desired language. In the situation where a web page having the desired information is intended for multi-national use, a particular web page providing an application may contain mixed languages. That is, if the user's preferred locale is different than the application default locale, several languages may appear on the web page.

Accordingly, there is a need in the art for a browser based entry form having a more user-friendly interface for allowing localization of labels on the entry form, that is, allowing viewing and entry of information in the user's preferred language. Desirably, such a browser based entry form should not require display of all possible locales, should not require display of mixed languages, and should display information according to the user's preferred locale even if different from the application default locale. Still further, such an entry form should allow viewing and updating information thereon without requiring accessing multiple menus, retrieving information from multiple web pages, or requiring constant refreshing/updating of the web or browser page on which the entry form is displayed. Even more, end-user editing should be enabled, without requiring participation of individual(s) at the host/server level or browser reconfiguration. Any improvements along such lines should further contemplate good engineering practices, such as relative inexpensiveness, stability, ease of implementation, low complexity, security, unobtrusiveness, etc.

SUMMARY OF THE INVENTION

The above-mentioned and other problems become solved by applying the principles and teachings associated with the hereinafter-described localized label user interface control. At a basic level, the invention provides methods, systems, and devices for user-friendly localization of an entry form for entry and display of data.

In one aspect, a method is provided for allowing a user-friendly localization of an entry form on an interactive web page. The method includes the steps of providing an entry form having a plurality of editable input fields corresponding to a plurality of locale codes, providing at least one visible input field for display, and maintaining the remainder of the plurality of input fields hidden until accessed. Data is received in at least one of said input fields and mapped to at least one input field selected from the plurality of input fields corresponding to a plurality of locale codes. In a representative embodiment, data is transferred asynchronously to and from the plurality of editable input fields, without requiring updating any other information displayed on the web page. Access to any of the plurality of hidden input fields may be provided via a localization icon.

It is desirable that the at least one visible input field be configured to display data according to a user's preferred locale code. In an alternative embodiment, data is displayed according to a best matching locale code, in the event the preferred locale code is not supported.

In another embodiment, a computing system for user-friendly localization of an entry form on an interactive web page includes a computing host containing a database and at least one client computing device for displaying a portion of the database on a web page as an entry form as set forth above. In an illustrative embodiment, the entry form displays data in at least one visible input field selected according to a user's preferred locale code and hides the remainder of the plurality of input fields until accessed. Data transferred to and from the plurality of editable input fields is transferred asynchronously between the computing host and the at least one client computing device, without requiring updating any other information displayed on the web page. The system may select a best matching locale code for display of data in the visible input field when the user's preferred locale code is not available.

In yet another embodiment, a computer program product available as a download or on a computer-readable medium for installation with a computing device of a user to view information on an interactive web page is provided, including a first component configured for mapping data into an entry form having a plurality of editable input fields corresponding to a plurality of locale codes. A second component is configured for displaying the entry form on a viewing screen of said entry form as at least one visible editable input field displaying data corresponding to a user's preferred locale code or a best matching locale code. A third component is configured to allow access by a user to the plurality of locale codes which are not displayed in the visible editable input field, such as by a localization button accessing a pop-in screen. Data accessed from or entered into one or more of the plurality of editable input fields is asynchronously transferred between a computing host and at least one client computing device on which the computer program product is installed.

In yet another aspect, a method is provided in a computing system environment for localization of an entry form displayed on an interactive web page hosted by the computing system environment. The method includes providing data in a database on a computing host and providing at least one client computing device for displaying an entry form having a plurality of editable input fields corresponding to a plurality of locale codes. Data is displayed in at least one visible editable input field according to a user's preferred locale code or a best matching locale code, whereas the remainder of the plurality of editable input fields remain hidden until accessed by the user. Typically, data transfer between the computing host and the plurality of editable input fields is performed asynchronously to minimize the need to access host resources and to reduce bandwidth consumption.

In still yet another aspect, a computing system environment for providing access to data in a multi-national setting is provided, to perform a method for localization of an entry form displayed on an interactive web page hosted by said computing system environment. The method performed by the computing system environment includes providing data in a database on a computing host, those data including a plurality of locale codes. At least one remote one remote client computing device accesses the computing host and displays an entry form having a plurality of editable input fields corresponding to the plurality of locale codes.

The data are displayed in at least one visible editable input field according to a user's preferred locale code or a best matching locale code, and the remainder of the plurality of editable input fields are hidden until accessed by the user. As set forth above, data transfer between the computing host and the plurality of editable input fields is performed asynchronously, without requiring updating of any additional information on the web page. In an illustrated embodiment, the entry form is configured to display data in a selected language according to the user's preferred locale code or a best matching locale code.

These and other embodiments, aspects, advantages, and features of the present invention will be set forth in the description which follows, and in part will become apparent to those of ordinary skill in the art by reference to the following description of the invention and referenced drawings or by practice of the invention. The aspects, advantages, and features of the invention are realized and attained by means of the instrumentalities, procedures, and combinations particularly pointed out in the appended claims.

BRIEF DESCRIPTION OF THE DRAWINGS

The accompanying drawings incorporated in and forming a part of the specification, illustrate several aspects of the present invention, and together with the description serve to explain the principles of the invention. In the drawings.

DETAILED DESCRIPTION OF THE ILLUSTRATED EMBODIMENTS

In the following detailed description of the illustrated embodiments, reference is made to the accompanying drawings that form a part hereof, and in which is shown by way of illustration, specific embodiments in which the invention may be practiced. These embodiments are described in sufficient detail to enable those skilled in the art to practice the invention and like numerals represent like details in the various figures. Also, it is to be understood that other embodiments may be utilized and that process, mechanical, electrical, arrangement, software and/or other changes may be made without departing from the scope of the present invention. In accordance with the present invention, methods and apparatus for localized label user interface control are hereinafter described.

In a representative embodiment (see FIG. 1), the values of one locale (in the illustrated embodiment, English-U.S.) are displayed on a browser based entry form 100 by default. The depicted embodiment shows an entry form 100 for objects such as Roles, with User Interface Controls for Role Name, Role Description, and the like being provided ("Security Officer" as illustrated). However, it will be appreciated that it is contemplated to use the entry form 100 for creating or editing a variety of objects, including without limitation Separation of Duty (SoD) Constraints and the like.

Figure 1:
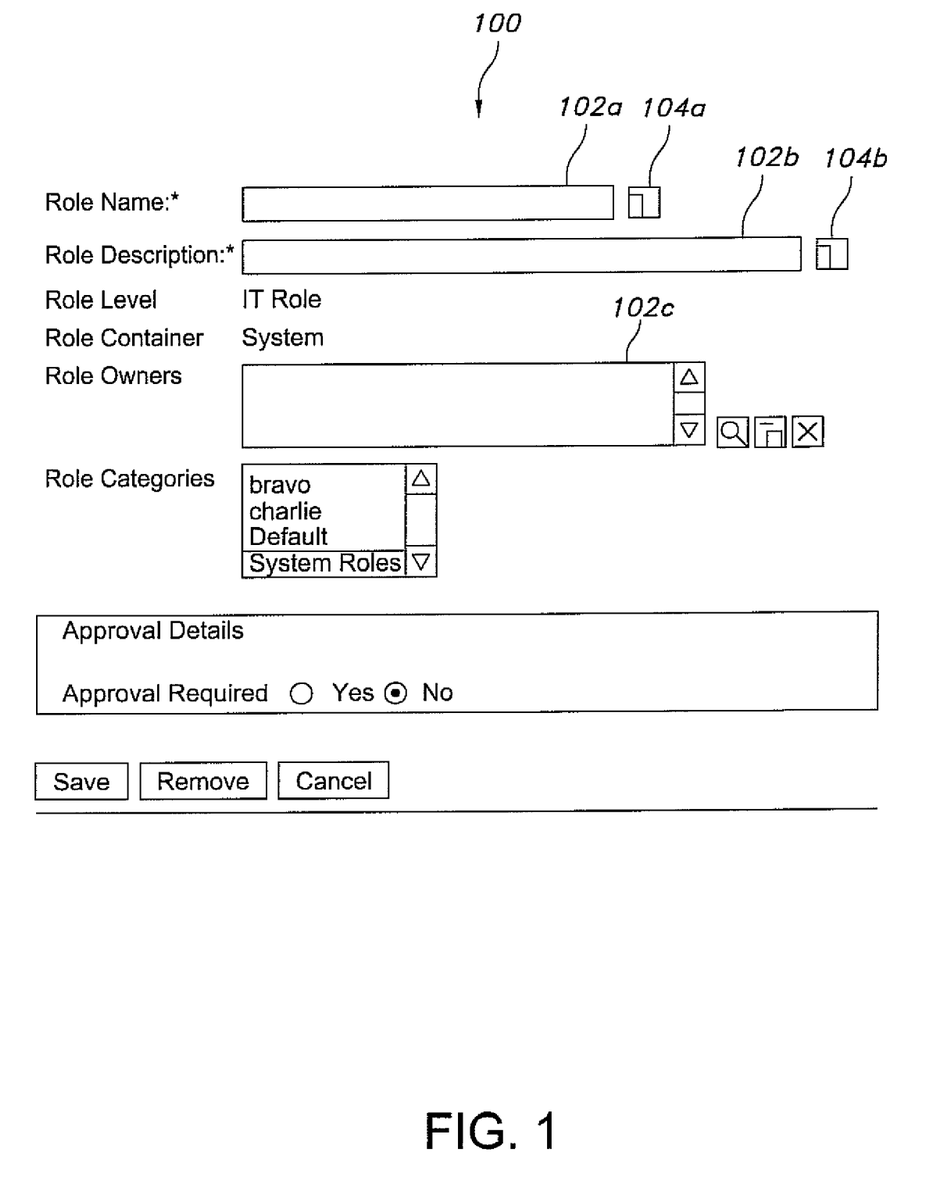
FIG. 1 shows a representative browser-based entry form according to the present invention.

The entry form 100 as depicted includes several visible editable input fields 102a, 102b, 102c. Other locales (not visible in this Figure) contained in the entry form 100 remain hidden until accessed by a user, and may be displayed when desired via a pop-in which may be accessed by a suitable localization icon 104a, 104b. The entry form 100 provides multiple editable input fields corresponding to multiple locale codes. The entry form 100 provides at least one visible input field 102 for display, with the remaining input fields remaining hidden. Such fields may be created by methods known in the art, such as by incorporating them into the browser HTML Markup. Data is mapped to at least one editable input field 102 according to the available locale codes.

Still other embodiments contemplate displaying the entry form 100 according to a user's preferred locale rather than the application default locale. In this manner, the visible input field 102 values are displayed according to the user's first choice, rather than requiring the user to reconfigure from the application default locale prior to use. Accordingly, the entry form 100 display remains in one language even if the application default locale is different than the user's locale. In addition, having the user's preferred locale in an editable visible input field 102 further reduces click-through when it is only that locale that needs editing. As a non-limiting example, if a translator is tasked with providing values for French, she would only need to access the page in her preferred locale and would not need to view the fields for other locales.

It is contemplated also to display the visible input field 102 corresponding to the user's preferred locale, but also to provide a "best match" option in the event the user's preferred locale is not available. It is known in this art to supply information for entry into an entry form 100 in the context of a full localization string which supplies the required commands to ascertain the language and other cultural particularities determining how the information is to be displayed. For example, the value that is saved by Novell's IDM Virtual Data Abstraction Layer is "locale code~value" delimited with |, such as: "en~Security Officer|nl~Beveiligingsfunctionaris| de~Sicherheitsbeauftragte"—where en, nl, and de are locale codes for English, Dutch, and German.

Figure 2:
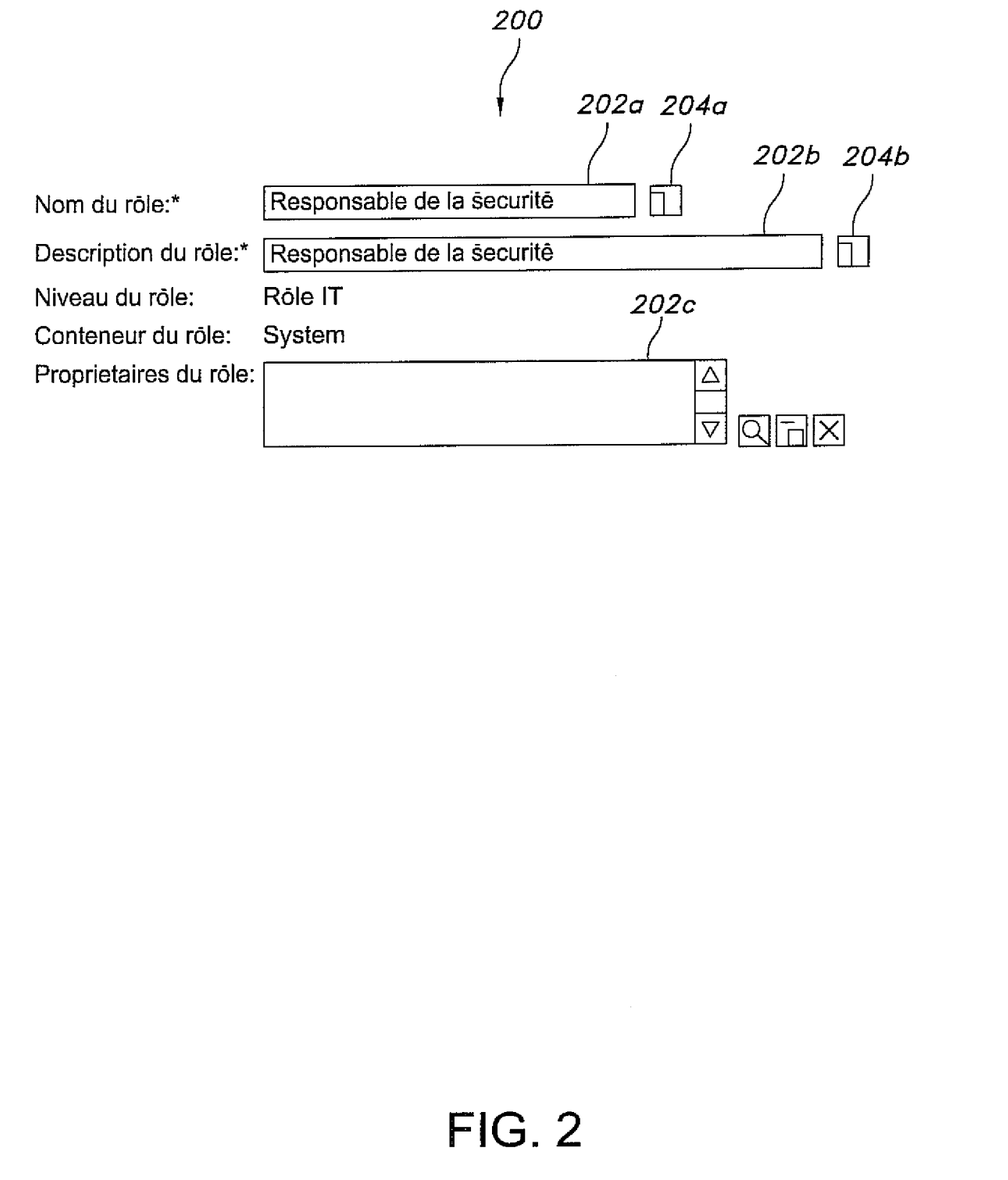
FIG. 2 shows the browser-based entry form of FIG. 1, after translation into a preferred locale language (French)

As a non-limiting example, the user may desire "French/ Belgium" or "fr/be" as the preferred locale for display. If that locale is supported, the information will display accordingly as described above. If, on the other hand, "fr/be" is not a supported locale, but "fr" is supported and has a locale value, the visible input field 102 will display the value using the "fr" code as the closest or best match available. This is depicted in FIG. 2, showing an entry form 200 in French as the default locale, selected by the user.

Such data may be accessed by the user for viewing, for editing, for inputting data into unused input fields 102, 202 corresponding to previously unused locale codes, and the like. It will be appreciated that displaying the values of one locale on the browser based entry form 100, 200 by default keeps the entry form 100, 200 tidy and allows the entry form to be smaller, with less input fields. Accordingly, the user interface is presented in a more user-friendly manner.

In addition, displaying the other locales in hidden but easily accessible input fields (described in greater detail below), rather than on an entirely different web page, reduces the number of browser page refreshes and click-throughs and eliminates the need for users to access different web pages and return to the original page with the entry form during the localization process, further increasing the user-friendliness. Further, having one locale in an editable visible input field 102, 202 reduces click-through when it is only that locale that needs editing. At the same time, accessing the hidden input fields, such as via a pop-in (see below) will show all the supported application locales, making localization for multiple locales simple to accomplish and further improving the user-friendliness of the entry form 100, 200.

Figure 3:
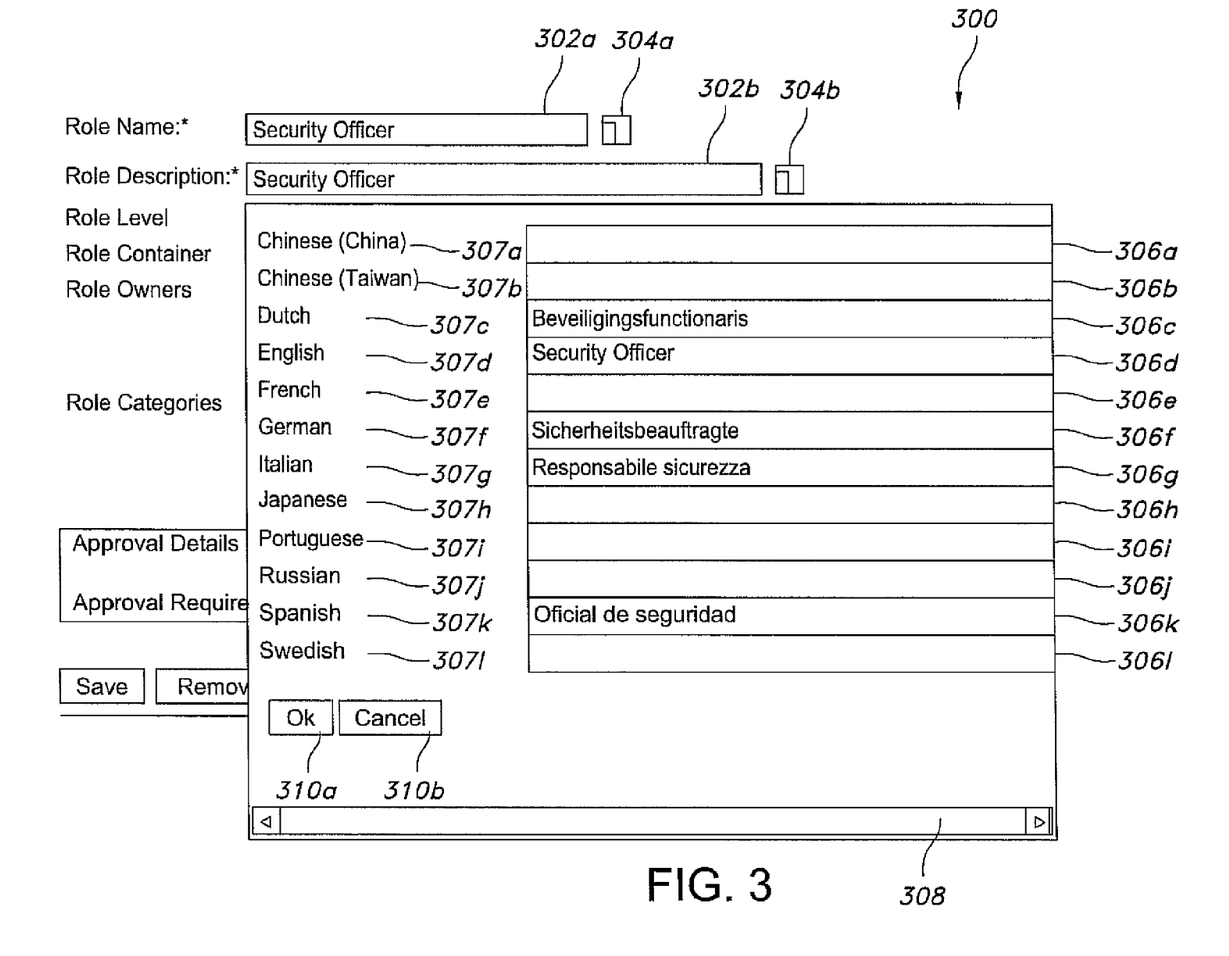
FIG. 3 shows the browser-based entry form of FIG. 1, with a pop-in displaying all supported locales.

An illustrative example is presented in FIG. 3, showing an application entry form 300 having visible editable input fields 302a, 302b and a localization icon 304a. In the illustrated embodiment, a localization icon (not shown) has been clicked by the user to display previously hidden editable input fields 306a-1, each editable input field 306a-1 corresponding to a particular locale which may or may not be supported by the application. In the depicted embodiment, Dutch, English, German, Italian, and Spanish are supported (306c, 306d, 306f, 306g, 306k, 306l). The hidden editable input fields 306a-1 are displayed in a pop-in 308. As an additional feature, the language identifiers showing the languages currently supported (noted in FIG. 3 as reference numerals 307a-1) will also be in the user's preferred locale language. In the displayed example, the language identifiers 307a-1 are in English, because English is the user's preferred locale language in the depicted embodiment. Similarly, if the user's preferred locale language is Dutch, the language identifiers 307a-1 will display in Dutch in pop-in 308.

Typically, data displayed in the pop-in 308 will be transferred asynchronously. Such asynchronous data transfer protocols are known in this art field, such as for example an asynchronous JavaScript and XML (AJAX) transfer protocol or AJAX "call." It will be appreciated that this method of asynchronous transfer requires less interaction with a server during the localization process, increasing the speed and user-friendliness of the localization process. In addition, displaying the hidden input fields 306a-1 using asynchronous data transfer allows the use of fewer network resources, i.e., reducing bandwidth consumption, thereby decreasing the costs associated with maintaining more network resources. Further, displaying the data as a pop-in 308 results in more rapid access to the information on the entry form 300 and pop-in 308, further increasing the speed and user-friendliness of the localization process.

Even more, a user is able to enter additional information into editable input fields 306. For example, using FIG. 3 as the illustrative example, the user may be tasked with entering a translation of the particular Role Description term shown, that is, Security Officer, into additional languages. The user need only input the translation into the editable entry field 306 corresponding to the language or languages into which the term is to be translated, and click a button 310a, 310b, to terminate the inputting session by either approving ("okay" button 310a) or canceling ("cancel" button 310b) the change, as desired. This information may then be transferred to a server (not shown in the Figure for convenience) to add to the database.

Figure 4:
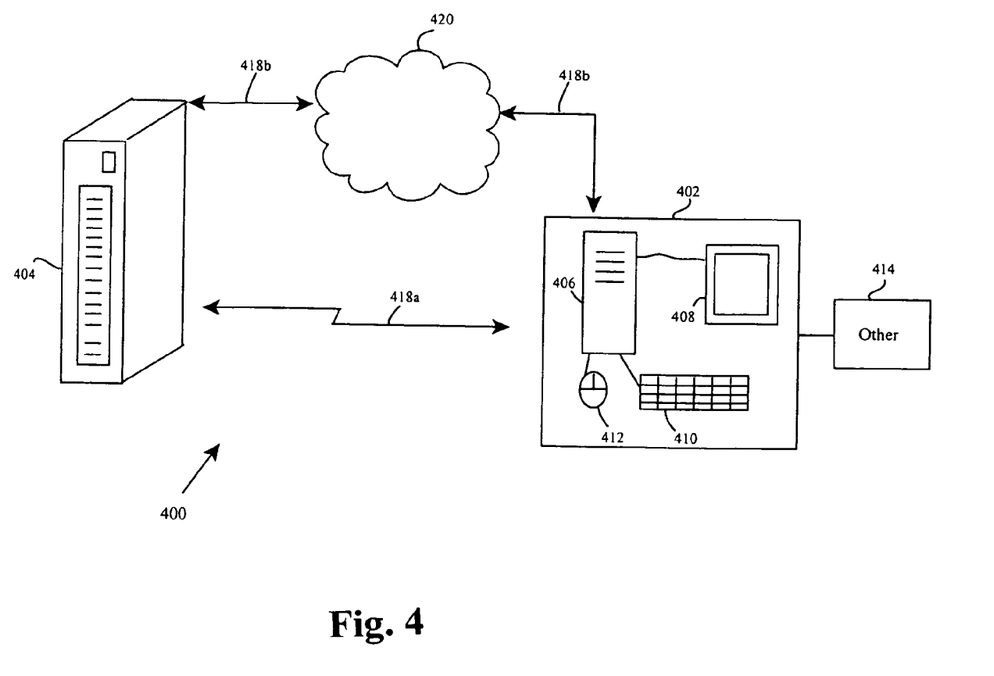
FIG. 4 schematically shows a computing system environment for providing the described browser-based entry form.

It will thus be appreciated that the method discussed above is readily adaptable to computing system environments, computing systems, and computer readable media for executing such instructions. With reference to FIG. 4, a representative computing environment 400 for localized label user interface control includes a computing device 402 arranged as an individual or networked physical or virtual machine for senders and/or recipients of item(s), including a host 404 and clients arranged with a variety of other networks and computing devices. In a traditional sense, an exemplary host 404 typifies a server, such as a grid or blade server. Brand examples include, but are not limited to, a Windows brand Server, a SUSE Linux Enterprise Server, a Red Hat Advanced Server, a Solaris server or an AIX server. A computing device 402 may also include a server 406, such as a grid or blade server.

Alternatively, a computing device 402 includes a general or special purpose computing device in the form of a conventional fixed or mobile (e.g., laptop) computer 406 having an attendant monitor 408 and user interface, such as a keyboard 410 or a mouse 412. The computer internally includes a processing unit for a resident operating system, such as DOS, WINDOWS, MACINTOSH, LEOPARD, VISTA, UNIX, and LINUX, to name a few, a memory, and a bus that couples various internal and external units, e.g., "Other" 414, to one another. Representative "other" items 414 include without limitation PDA's, cameras, scanners, printers, microphones, joy sticks, game pads, satellite dishes, hand-held devices, consumer electronics, minicomputers, computer clusters, main frame computers, a message queue, a peer computing device, a broadcast antenna, a web server, an AJAX client, a grid-computing node, a virtual machine, a web service endpoint, a cellular phone, or the like. The other items may also be stand alone computing devices in the environment 400 or the computing device 402 itself.

Storage devices are contemplated and may be remote or local. While the line is not well defined, local storage generally has a relatively quick access time and is used to store frequently accessed data, while remote storage has a much longer access time and is used to store data that is accessed less frequently. The capacity of remote storage is also typically an order of magnitude larger than the capacity of local storage. Regardless, storage is representatively provided for aspects of the invention contemplative of computer executable instructions, e.g., software, as part of computer program products on readable media, e.g., disk for insertion in a drive of computer 406.

It will therefore be appreciated that the system 400 shown in FIG. 4 is configured to perform the tasks required of the present computer system/computing system environment as set forth above, and that computer software for performing those tasks is contemplated. In particular, using the entry form 300 shown in FIG. 3 as a representative example, computer executable instructions are contemplated including a first component for mapping data into the entry form 300, a second component for displaying entry form 300 on a monitor 408 as at least one visible editable input field 302, and a third component for accessing hidden input fields 306, such as via a localization icon 304 for accessing pop-in 308 (see FIG. 3).

Computer executable instructions may be made available for installation as a download or may reside in hardware, firmware or combinations in the device 402. When described in the context of computer program products, it is denoted that items thereof, such as modules, routines, programs, objects, components, data structures, etc., perform particular tasks or implement particular abstract data types within various structures of the computing system which cause a certain function or group of functions. In form, the computer product can be a download of executable instructions resident with a downstream computing device, or readable media, received from an upstream computing device or readable media, a download of executable instructions resident on an upstream computing device, or readable media, awaiting transfer to a downstream computing device or readable media, or any available media, such as RAM, ROM, EEPROM, CD-ROM, DVD, or other optical disk storage devices, magnetic disk storage devices, floppy disks, or any other physical medium which can be used to store the items thereof and which can be assessed in the environment.

In network, the host 404 and computing device 402 communicate with one another via wired, wireless or combined connections 418 that are either direct 418*a* or indirect 418*b*. If direct, they typify connections within physical or network proximity (e.g., intranet). If indirect, they typify connections such as those found with the internet, satellites, radio transmissions, or the like, and are represented schematically as element 420. In this regard, other contemplated items include servers, routers, peer devices, modems, T# lines, satellites, microwave relays or the like. The connections may also be local area networks (LAN), metro area networks (MAN), and/or wide area networks (WAN) that are presented by way of example and not limitation. The topology is also any of a variety, such as ring, star, bridged, cascaded, meshed, or other known or hereinafter invented arrangement.

A representative embodiment will now be discussed. As discussed above, FIG. 1 illustrates a representative browser based entry form 100 for localized label user interface control. The entry form 100 is typically displayed on a monitor 408 (from FIG. 4) of a computing device 402 and includes editable input fields 102 as well as the localization buttons 104. Localization buttons 104*a*, 104*b* display a pop-in 308 sub-form when clicked, which contains hidden editable input fields 306 (see FIG. 3). In the embodiment shown in FIG. 1, the user-preferred locale (and therefore display language) is English, whereas in FIG. 2 the user-preferred locale and language is French. This user-preferred locale determination may be made via an asynchronous transfer protocol such as an AJAX call to host 404, or may be saved in the browser configuration.

Figure 5:
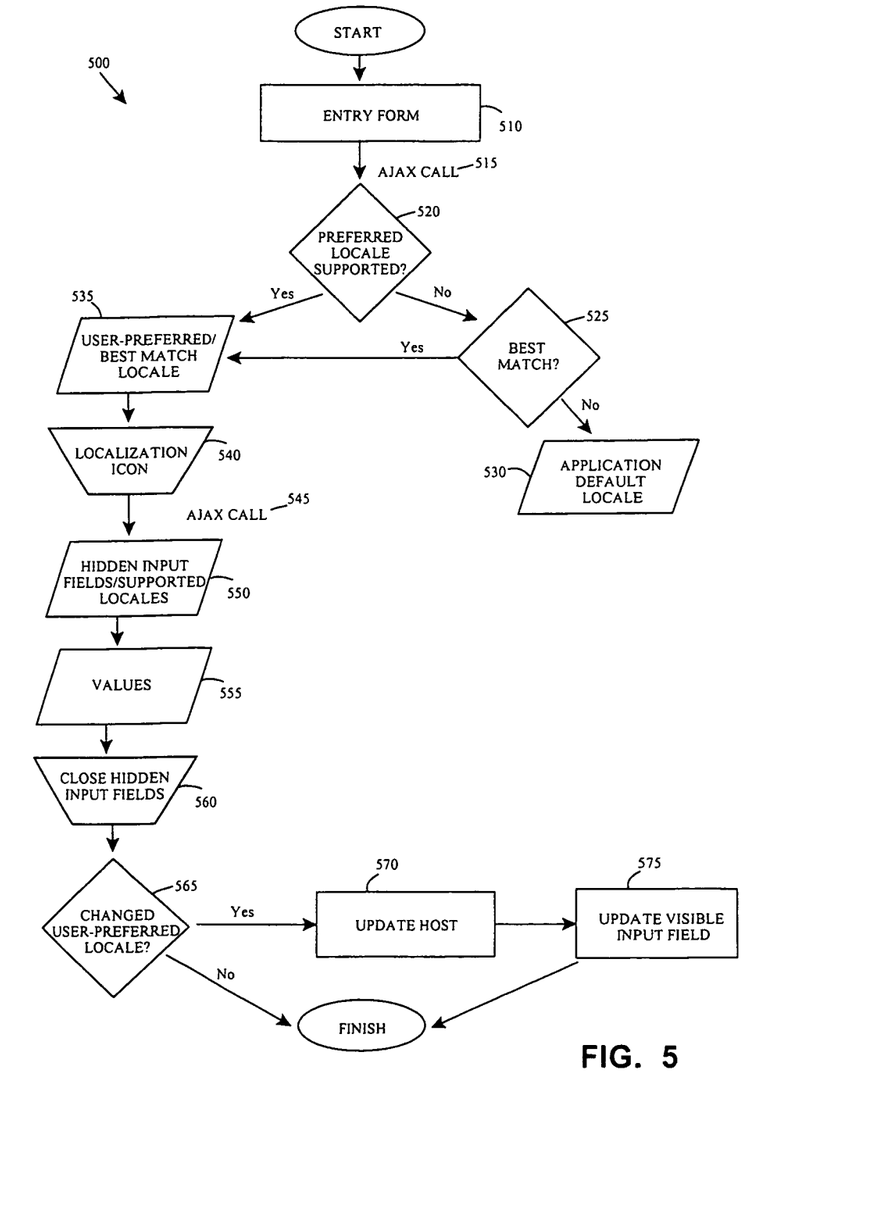
FIG. 5 is a flow chart for entering data into a representative browser-based entry form in accordance with the present invention.

With reference to FIG. 5, wherein the overall flow of a user-friendly browser-based entry form as described herein is given generically as 500, a user accesses the browser-based entry form at step 510. Via an AJAX call 515 to a host, it is determined whether the user-preferred locale is supported (step 520). If it is not, it is ascertained whether a best match locale is supported (step 525). If a best match locale is not supported, the entry form is displayed as the application default locale (step 530). If the user-preferred locale or a best match locale are supported, the entry form is displayed accordingly (step 535).

Next, the user may click the localize button or icon (step 540). In the embodiment shown in FIG. 3, a user has clicked the localize button 104*b* (from FIG. 1) using a mouse 412, and a pop-in 308 sub-form is displayed. The pop-in sub-form includes an "okay" button 310*a*, a "cancel" button 310*b*, and previously hidden editable input fields 306*a*-1 corresponding to a list of locales. Accordingly, FIG. 3 shows the entry form 100 after a user has clicked the localize button 104*b* (from FIG. 1) and is viewing translated information corresponding to the "Security Officer" entry in editable input field 302*a*, or is ready to enter additional values. In certain embodiments, translation software or a web-based translator may be used to enter any of the values in the input fields in the pop-in 308 sub-form, such as via keyboard 410.

Returning to FIG. 5, rendering the control by clicking the localization button 104*b* retrieves all supported locales (see FIG. 3), such as by an AJAX call 545 to server 404. If particular editable hidden fields 306*a*-1 have existing input localized values, a pre-populated field is displayed (step 550). On the other hand, if no existing localized values are available for individual editable input fields 306*a*-1, no values will be displayed. This is depicted in FIG. 3. In particular embodiments, hidden editable input field values or locale codes (the full-localization-string) may be formatted in the same format as utilized by Novell's IDM Virtual Data Abstraction Layer ("locale code~value" delimited with |).

If the hidden field has a value, the full-localization-string is parsed (such as by a JavaScript object) and calculates which localized value should appear in the visible input field 102*b* by determining the user's preferred locale. This could either be a saved preference for the user or the user's browser's locale. Next, the JavaScript object matches the preferred locale with the best supported locale that has a value. In the example set forth above, the user's preferred locale is French/Belgium (fr-be), but only fr is supported. Therefore, the application acquires the value for fr from host 404 and displays it (FIG. 2). This reduces the times a user must see a page with mixed languages. If fr were to have no value, editable input field 102*b* would display the application default locale's value, if available. If the hidden editable input field 306*a*-1 were to have no value, the visible input field 102*b* would be left empty.

When the user clicks the localize button 102*b*, the JavaScript object issues another AJAX call 545 to retrieve the supported locales, maps each localized value in the full-localization-string to the appropriate supported locale, captures any changes made to the visible input field 102*b* and maps that value to the best supported locale for the user's preferred locale, then displays the locale with each localized value in an editable hidden input field 306*a*-1 in a pop-in 308. The user can make changes to localized values in the pop-in 308 then close it using button 310*a* (steps 555, 560 of FIG. 5). If the user had changed the best matching locale's value for a preferred locale, the JavaScript object updates the visible input field 102*b*. All values are compiled into the internal format and a full-localization-string is constructed and placed in the appropriate hidden editable input field 306*a*-1. As with all UI Controls, the value in the appropriate hidden editable input field 306*a*-1 is what is sent to the server 404 to be saved, first validating for required fields (steps 570, 575 of FIG. 5).

Certain advantages of the invention over the prior art should now be readily apparent. For example, the present disclosure sets forth a method for providing a browser-based entry form, computing systems and computing system environments for providing that form, and particular browser-based entry forms in accordance with the method, which significantly reduce the amount of communication with a host needed to provide desired information. The entry form is tidy, requires minimal access to other web pages and/or click-throughs to view or edit desired information, and minimizes the incidence or time which a user must spend viewing pages or forms containing mixed languages. Even more, the invention allows end user editing of entry forms for localization purposes, rather than requiring that the browser be reconfigured and/or the individual(s) responsible maintenance at the host/server level make such edits. These features contribute to providing a user interface for an entry form that is significantly more user-friendly than prior art methods for providing such forms, and which consumes significantly fewer resources (bandwidth) in providing the desired information.

Finally, one of ordinary skill in the art will recognize that additional embodiments are also possible without departing from the teachings of the present invention. This detailed description, and particularly the specific details of the exemplary embodiments disclosed herein, is given primarily for clarity of understanding, and no unnecessary limitations are to be implied, for modifications will become obvious to those skilled in the art upon reading this disclosure and may be made without departing from the spirit or scope of the invention. Relatively apparent modifications, of course, include combining the various features of one or more figures with the features of one or more of other figures.

The invention claimed is:

1. A method for allowing a user-friendly localization of an entry form on an interactive web page, comprising:
    providing an entry form having visible field related to a plurality of editable input fields, the plurality of editable input fields corresponding to a plurality of locale codes, the visible field being configured to display one of the plurality of editable input fields, wherein a remainder of the plurality of editable input fields are hidden until accessed;
    receiving data for at least one of said editable input fields;
    mapping said receiving data to the at least one of said editable input fields; and
    accessing at least one of the remainder of the plurality of editable input fields through a localization icon;
    wherein data is transferred asynchronously to and from said plurality of editable input fields, without requiring updating any other information displayed on the web page.

2. The method of claim 1, wherein the plurality of editable input fields may be accessed by the user to view said received data, to edit said received data, to input additional data into one or more editable input fields to which data has not been mapped, and any combination thereof.

3. The method of claim 1, wherein the visible field is pre-populated with one of the plurality of editable input fields associated with a user's preferred locale code.

4. The method of claim 1, wherein said data is a full localization string.

5. The method of claim 1, including the step of pre-populating the visible field with one of the plurality of editable input fields according to a best matching locale code when the user's preferred locale code is not available.

6. A computing system for user-friendly localization of an entry form on an interactive web page, comprising:
    a computing host containing a database;
    at least one client computing device for displaying a portion of said database on a web page as an entry form having a visible field related to a plurality of editable input fields, the plurality of editable input fields corresponding to a plurality of locale codes;
    wherein said visible field displays data in one of the plurality of editable input fields selected according to a user's preferred locale code and hides data in the remainder of the plurality of editable input fields until accessed; and
    accessing at least one of the remainder of the plurality of editable input fields through a localization icon;
    further wherein data transferred to and from said plurality of editable input fields is transferred asynchronously between the computing host and the at least one client computing device, without requiring updating any other information displayed on the web page.

7. The computing system of claim 6, wherein a best matching locale code is selected for display of data when the user's preferred locale code is not available.

8. The computing system of claim 6, wherein data mapped to the plurality of editable input fields is received asynchronously from the computing host by the at least one client computing device.

9. The computing system of claim 6, wherein data input into any one of the plurality of editable input fields is sent asynchronously from the at least one client computing device to the computing host.

10. A computer program product available as a download or on a computer-readable storage medium having embodied computer-executable instructions for installation with a computing device of a user to view information on an interactive web page, the computing device having a viewing screen, comprising:
    a first component configured for mapping data into an entry form having a visible field related to a plurality of editable input fields corresponding to a plurality of locale codes, said data being transferred asynchronously to and from said plurality of editable input fields;
    a second component configured for displaying said entry form on the viewing screen of said computing device as at least the visible field displaying data corresponding to a user's preferred locale code or a best matching locale code, wherein a remainder of the local codes remain hidden in the viewing screen until accessed; and
    a third component configured to allow a user to have access to the remainder of the plurality of locale codes through a localization icon.

11. The computer program product of claim 10, wherein the remainder of the plurality of locale codes which are not displayed in the visible field are mapped to hidden editable input fields accessible via the third component.

12. The computer program product of claim 10, wherein data accessed from or entered into one or more of the plurality of editable input fields is asynchronously transferred between a computing host and at least one client computing device on which the computer program product is installed.

13. The computer program product of claim 10, wherein the second component is configured to select the user's preferred locale code or a best matching alternative locale code for displaying data in the visible field.

14. In a computing system environment, a method for localization of an entry form displayed on an interactive web page hosted by said computing system environment, comprising:
   providing data in a database on a computing host;
   providing at least one client computing device for displaying an entry form having a visible field related to a plurality of editable input fields corresponding to a plurality of-locale codes;
   making visible one of the plurality of editable input fields in the visible field and displaying said data therein according to a user's preferred locale code or a best matching locale code; and
   maintaining the remainder of the plurality of editable input fields hidden until accessed by the user;
   accessing at least one of the remainder of the plurality of editable input fields through a localization icon;
   wherein data transfer between the computing host and the plurality of editable input fields is performed asynchronously.

15. In a computing system environment for providing access to data in a multi-national setting, a method for localization of an entry form displayed on an interactive web page hosted by said computing system environment, comprising:
   providing data in a database on a computing host, said data including a plurality of locale codes;
   providing at least one remote client computing device for displaying an entry form having a visible field configured to display one of a plurality of editable input fields corresponding to the plurality of locale codes according to a user's preferred locale code or a best matching locale code; and
   maintaining the remainder of the plurality of editable input fields hidden until accessed by the user;
   accessing at least one of the remainder of the plurality of editable input fields through a localization icon;
   wherein data transfer between the computing host and the plurality of editable input fields is performed asynchronously, without requiring updating of any additional information on the web page.

16. The method of claim 15, wherein the remainder of the plurality of editable input fields are made visible to the user when the at least one of the remainder of the plurality of editable input fields is accessed.

17. The method of claim 15, wherein the entry form is configured to display data in a selected language according to the user's preferred locale code or a best matching locale code.

18. The method of claim 15, wherein data transfer between the computing host and the plurality of editable input fields is performed by asynchronous content loading.

19. The method of claim 18, wherein data transfer between the computing host and the plurality of editable input fields is performed by an asynchronous JavaScript and XML (AJAX) protocol.

* * * * *